United States Patent
Tezuka et al.

(10) Patent No.: US 10,444,358 B2
(45) Date of Patent: Oct. 15, 2019

(54) DISTANCE MEASURING APPARATUS, DISTANCE MEASURING METHOD, AND TABLE CREATING METHOD

(71) Applicant: FUJITSU LIMITED, Kawasaki-shi, Kanagawa (JP)

(72) Inventors: Koichi Tezuka, Kobe (JP); Koichi Iida, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 403 days.

(21) Appl. No.: 15/287,279

(22) Filed: Oct. 6, 2016

(65) Prior Publication Data
US 2017/0102461 A1    Apr. 13, 2017

(30) Foreign Application Priority Data

Oct. 9, 2015    (JP) .................................. 2015-200783

(51) Int. Cl.
*G01S 17/00* (2006.01)
*G01S 17/08* (2006.01)
*G01S 7/491* (2006.01)

(52) U.S. Cl.
CPC ............. *G01S 17/08* (2013.01); *G01S 7/4911* (2013.01)

(58) Field of Classification Search
USPC ................................................ 356/5.01, 4.01
See application file for complete search history.

(56) References Cited

U.S. PATENT DOCUMENTS

| 5,760,886 A  * | 6/1998 | Miyazaki .................. B60T 7/22 180/169 |
| 6,301,003 B1 | 10/2001 | Shirai et al. |
| 6,459,484 B1 * | 10/2002 | Yokoi ....................... G01J 3/02 356/318 |

(Continued)

FOREIGN PATENT DOCUMENTS

| JP | 06-020079 | 1/1994 |
| JP | 07-063512 | 3/1995 |

(Continued)

OTHER PUBLICATIONS

Office Action dated May 7, 2019 in corresponding Japanese Patent Application No. 2015-200783 (4 pages) (4 pages English Translation).

(Continued)

*Primary Examiner* — James R Hulka
(74) *Attorney, Agent, or Firm* — Staas & Halsey LLP

(57) ABSTRACT

A distance measuring apparatus includes a projector configured to project laser beam at a projection angle to an object; a photodetector array in which a plurality of photodetectors are arranged; a condenser lens configured to concentrate, on the photodetector array, the laser beam reflected by the object positioned on a direction of the projection angle; a detector configured to detect an output of at least one of the photodetectors of the photodetector array; and a selector configured to select the photodetector from which the detector receives the output, depending on a distortion of an area on the photodetector array irradiated with the reflected laser beam when the projection angle is large, the area being determined by an angle of incidence of the reflected laser beam to the condenser lens, the angle of incidence being associated with the projection angle.

9 Claims, 16 Drawing Sheets

(56) References Cited

U.S. PATENT DOCUMENTS

| | | | | |
|---|---|---|---|---|
| 7,304,798 B2* | 12/2007 | Izumi | .................. | G01J 3/18 356/454 |
| 8,451,432 B2* | 5/2013 | Crawford | ................ | G01S 17/66 356/4.01 |
| 2002/0027665 A1* | 3/2002 | Abe | .................. | G01B 11/0683 356/630 |
| 2002/0196424 A1* | 12/2002 | Sano | ................ | G01C 3/08 356/4.01 |
| 2003/0090647 A1* | 5/2003 | Isogai | .................. | G01C 3/22 356/4.01 |
| 2005/0110999 A1* | 5/2005 | Erdogan | ............... | G01J 3/4406 356/417 |
| 2005/0206873 A1 | 9/2005 | Tanaka et al. | | |
| 2006/0012785 A1* | 1/2006 | Funk | .................. | G01J 3/02 356/301 |
| 2010/0277748 A1* | 11/2010 | Potapenko | ........... | G01B 11/026 356/623 |
| 2011/0019188 A1* | 1/2011 | Ray | .................. | B64D 15/20 356/342 |
| 2011/0222064 A1 | 9/2011 | Umeda et al. | | |
| 2013/0070239 A1* | 3/2013 | Crawford | ................ | G01S 17/66 356/139.04 |
| 2013/0077176 A1 | 3/2013 | Ohtomo et al. | | |
| 2014/0125981 A1 | 5/2014 | Iga et al. | | |
| 2015/0015756 A1* | 1/2015 | Suzuki | ................ | H04N 5/2254 348/302 |
| 2018/0081045 A1 | 3/2018 | Gylys et al. | | |

FOREIGN PATENT DOCUMENTS

| | | |
|---|---|---|
| JP | 2000-056018 | 2/2000 |
| JP | 2001-66495 | 3/2001 |
| JP | 2004-110293 | 4/2004 |
| JP | 2004-157044 | 6/2004 |
| JP | 2005-265606 | 9/2005 |
| JP | 2007-085832 | 4/2007 |
| JP | 2010-122183 | 6/2010 |
| JP | 2011-89874 | 5/2011 |
| JP | 2013-072771 | 4/2013 |
| JP | 2014-59301 | 4/2014 |
| JP | 2014-095594 | 5/2014 |

OTHER PUBLICATIONS

Non-Final Office Action dated Aug. 9, 2019 in related U.S. Appl. No. 15/357,248 (11 pages).

* cited by examiner

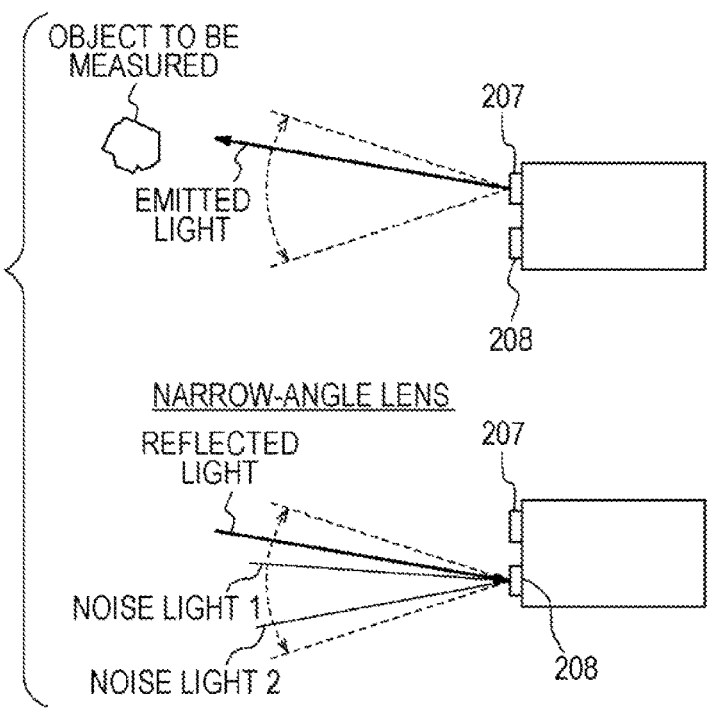
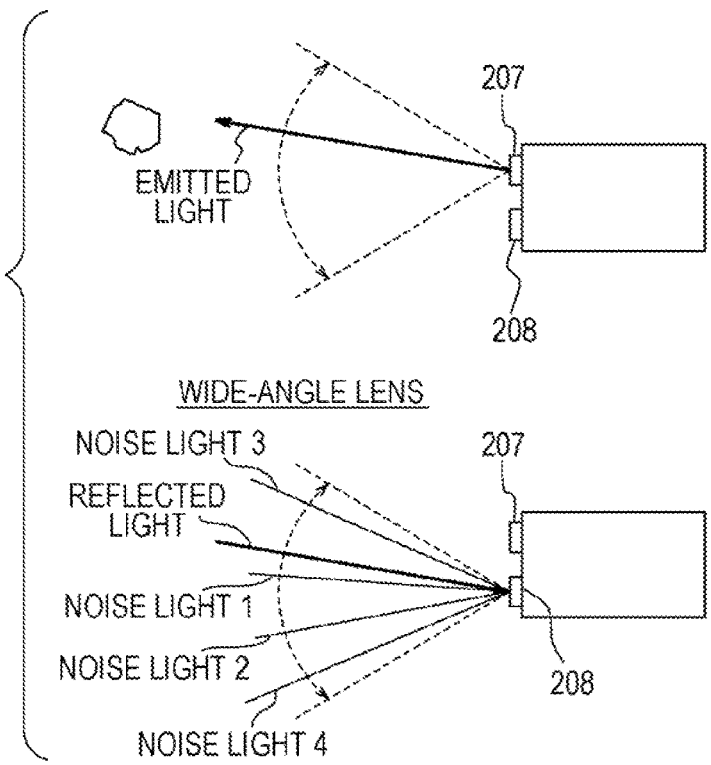

| VERTICAL ANGLE V | HORIZONTAL ANGLE H | SELECTION INFORMATION (ON=1, OFF=0) ARRAY OF LIGHT-RECEIVING CHANNELS [D(11), ..., D(m1), D(12), ..., D(m2), D(1n), ..., D(mn)] |
|---|---|---|
| 10 | 10 | (1, 1, 1, 1, 0, 0, 0, ..., 0, 0, 0) |
|  | ... | ..... |
|  | −10 | (0, 0, 0, ..., 1, 1, 1, 1, 0, 0, ..., 0, 0, 0) |
| ⋮ | ⋮ | ⋮     ⋮ |
| −10 | 10 | (0, 0, 0, ..., 1, 1, 1, 1, 0, 0, ..., 0, 0, 0) |
|  | ... | ..... |
|  | −10 | (0, 0, 0, ..., 0, 0, 0, 1, 1, 1, 1) |

FIG. 8

| VERTICAL ANGLE V | HORIZONTAL ANGLE H | CENTROID POSITION (REPRESENTATIVE POSITION) | SELECTABLE AREA |
|---|---|---|---|
| 10 | 10 | D[X(10, 10), Y(10, 10)] | D(X−1, Y−1), D(X, Y−1) D(X, Y+1), D(X+1, Y−2) D(X+1, Y−1), D(X+1, Y) D(X+1, Y+1), D(X+1, Y+2) |
|  | ... | ... | ... |
|  | −10 | D[X(10, −10), Y(10, −10)] | D(X−1, Y−1), D(X, Y−1) D(X, Y+1), D(X+1, Y−2) D(X+1, Y−1), D(X+1, Y) D(X+1, Y+1), D(X+1, Y+2) |
| ⋮ | ⋮ | ⋮ | ⋮ |
| −10 | 10 | D[X(−10, 10), Y(−10, 10)] | D(X−1, Y−1), D(X, Y−1) D(X, Y+1), D(X+1, Y−2) D(X+1, Y−1), D(X+1, Y) D(X+1, Y+1), D(X+1, Y+2) |
|  | ... | ... | ... |
|  | −10 | D[X(−10, −10), Y(−10, −10)] | D(X−1, Y−1), D(X, Y−1) D(X, Y+1), D(X+1, Y−2) D(X+1, Y−1), D(X+1, Y) D(X+1, Y+1), D(X+1, Y+2) |

| VERTICAL ANGLE V | HORIZONTAL ANGLE H | REPRESENTATIVE POSITION | PATTERN |
|---|---|---|---|
| 10 | 10 | D[X(10, 10), Y(10, 10)] | (1) |
|  | ... | ... | ... |
|  | −10 | D[X(10, −10), Y(10, −10)] | (2) |
| ⋮ | ⋮ | ⋮ | ⋮ |
| −10 | 10 | D[X(−10, 10), Y(−10, 10)] | (7) |
|  | ... | ... | ... |
|  | −10 | D[X(−10, −10), Y(−10, −10)] | (8) |

FIG. 10A

| LASER EMISSION COUNT | SELECTION INFORMATION (ON=1, OFF=0) ARRAY OF LIGHT-RECEIVING CHANNELS [D(11), ..., D(m1), D(12), ..., D(m2), D(1n), ..., D(mn)] |
|---|---|
| 1 | (1, 1, 1, 1, 0, 0, 0, ..., 0, 0, 0) |
| 2 | (1, 1, 1, 1, 0, 0, 0, ..., 0, 0, 0) |
| 3 | (0, 1, 1, 1, 1, 0, 0, ..., 0, 0, 0) |
| ... | ... |
| z-2 | (0, 0, 0, ..., 0, 0, 1, 1, 1, 1, 0) |
| z-1 | (0, 0, 0, ..., 0, 0, 0, 1, 1, 1, 1) |
| z | (0, 0, 0, ..., 0, 0, 0, 1, 1, 1, 1) |

FIG. 10B

| LASER EMISSION COUNT | CENTROID POSITION (REPRESENTATIVE POSITION) | PATTERN |
|---|---|---|
| 1 | $D(X_1, Y_1)$ | (1) |
| 2 | $D(X_2, Y_2)$ | (2) |
| 3 | $D(X_3, Y_3)$ | (3) |
| ... | ⋮ | ⋮ |
| z-2 | $D(X_{Z-2}, Y_{Z-2})$ | (8) |
| z-1 | $D(X_{Z-1}, Y_{Z-1})$ | (9) |
| z | $D(X_Z, Y_Z)$ | (10) |

FIG. 11

| LASER EMISSION COUNT | CENTROID POSITION (REPRESENTATIVE POSITION) | SELECTABLE AREA |
|---|---|---|
| 1 | $D(X_1, Y_1)$ | $D(X_1-1, Y_1-1), D(X_1, Y_1-1)$<br>$D(X_1, Y_1+1), D(X_1+1, Y_1-2)$<br>$D(X_1+1, Y_1-1), D(X_1+1, Y_1)$<br>$D(X_1+1, Y_1+1), D(X_1+1, Y_1+2)$ |
| 2 | $D(X_2, Y_2)$ | $D(X_2-1, Y_2-1), D(X_2, Y_2-1)$<br>$D(X_2, Y_2+1), D(X_2+1, Y_2-2)$<br>$D(X_2+1, Y_2-1), D(X_2+1, Y_2)$<br>$D(X_2+1, Y_2+1), D(X_2+1, Y_2+2)$ |
| 3 | $D(X_3, Y_3)$ | $D(X_3-1, Y_3-1), D(X_3, Y_3-1)$<br>$D(X_3, Y_3+1), D(X_3+1, Y_3-2)$<br>$D(X_3+1, Y_3-1), D(X_3+1, Y_3)$<br>$D(X_3+1, Y_3+1), D(X_3+1, Y_3+2)$ |
| ⋮ | ⋮ | ⋮ |
| z-2 | $D(X_{Z-2}, Y_{Z-2})$ | $D(X_{Z-2}-1, Y_{Z-2}-1), D(X_{Z-2}, Y_{Z-2}-1)$<br>$D(X_{Z-2}, Y_{Z-2}+1), D(X_{Z-2}+1, Y_{Z-2}-2)$<br>$D(X_{Z-2}+1, Y_{Z-2}-1), D(X_{Z-2}+1, Y_{Z-2})$<br>$D(X_{Z-2}+1, Y_{Z-2}+1), D(X_{Z-2}+1, Y_{Z-2}+2)$ |
| z-1 | $D(X_{Z-1}, Y_{Z-1})$ | $D(X_{Z-1}-1, Y_{Z-1}-1), D(X_{Z-1}, Y_{Z-1}-1)$<br>$D(X_{Z-1}, Y_{Z-1}+1), D(X_{Z-1}+1, Y_{Z-1}-2)$<br>$D(X_{Z-1}+1, Y_{Z-1}-1), D(X_{Z-1}+1, Y_{Z-1})$<br>$D(X_{Z-1}+1, Y_{Z-1}+1), D(X_{Z-1}+1, Y_{Z-1}+2)$ |
| z | $D(X_Z, Y_Z)$ | $D(X_Z-1, Y_Z-1), D(X_Z, Y_Z-1)$<br>$D(X_Z, Y_Z+1), D(X_Z+1, Y_Z-2)$<br>$D(X_Z+1, Y_Z-1), D(X_Z+1, Y_Z)$<br>$D(X_Z+1, Y_Z+1), D(X_Z+1, Y_Z+2)$ |

DISTANCE MEASURING APPARATUS, DISTANCE MEASURING METHOD, AND TABLE CREATING METHOD

CROSS-REFERENCE TO RELATED APPLICATION

This application is based upon and claims the benefit of priority of the prior Japanese Patent Application No. 2015-200783, filed on Oct. 9, 2015, the entire contents of which are incorporated herein by reference.

FIELD

The embodiments discussed herein are related to a distance measuring apparatus, a distance measuring method, and a table creating method.

BACKGROUND

Recently, distance measuring apparatuses such as laser radars have been used not only for measuring a distance to an object but also in various scenes such as for the purposes of monitoring surroundings, for example, detecting obstacles for an automobile or detecting a person between doors for automatic platform gates and cars of a train at a railroad platform.

For such distance measuring apparatuses, a desire for increasing a measurement range for measuring the object is expected to grow. To address this, it is conceivable that a distance measuring apparatus is equipped with a projection system using an optical system that increases a light projection range, and with a wide-angle lens used as a condenser lens. In this case, however, noise light incident on the condenser lens also increases, and accordingly a signal-to-noise (S/N) ratio decreases. Thus, it is conceivable to use a photodetector array to selectively use outputs of photodetectors in an area irradiated with optical feedback from the measurement object (see Japanese Laid-open Patent Publication No. 2004-157044).

SUMMARY

According to an aspect of the invention, a distance measuring apparatus includes a projector configured to project laser beam at a projection angle to an object; a photodetector array in which a plurality of photodetectors are arranged; a condenser lens configured to concentrate, on the photodetector array, the laser beam reflected by the object positioned on a direction of the projection angle; a detector configured to detect an output of at least one of the photodetectors of the photodetector array; and a selector configured to select the photodetector from which the detector receives the output, depending on a distortion of an area on the photodetector array irradiated with the reflected laser beam when the projection angle is large, the area being determined by an angle of incidence of the reflected laser beam to the condenser lens, the angle of incidence being associated with the projection angle.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram exemplifying a case where an angle increasing lens (with a small enlargement factor) is used as a projector and a narrow-angle lens is used as a condenser lens of a light-receiver;

FIG. 2B is a diagram exemplifying a case where an angle increasing lens (with a large enlargement factor) is used as the projector and a wide-angle lens is used as the condenser lens of the light-receiver;

FIG. 8 is a diagram exemplifying another example of the table;

FIGS. 10A and 10B are diagrams each illustrating another example of the table;

FIG. 11 is a diagram exemplifying another example of the table;

DESCRIPTION OF EMBODIMENTS

In the related technology, because of aberrations of the condenser lens, the area irradiated with light may be distorted depending on an incident angle of view onto the condenser lens. In this case, accuracy of selecting the photodetectors deteriorates.

According to one aspect, an object of the present disclosure is to provide a distance measuring apparatus, a distance measuring method, and a table creating method, which may improve accuracy of selecting photodetectors in a photodetector array.

Before describing embodiments, a brief description of a distance measuring apparatus will be given.

Figure 1A:
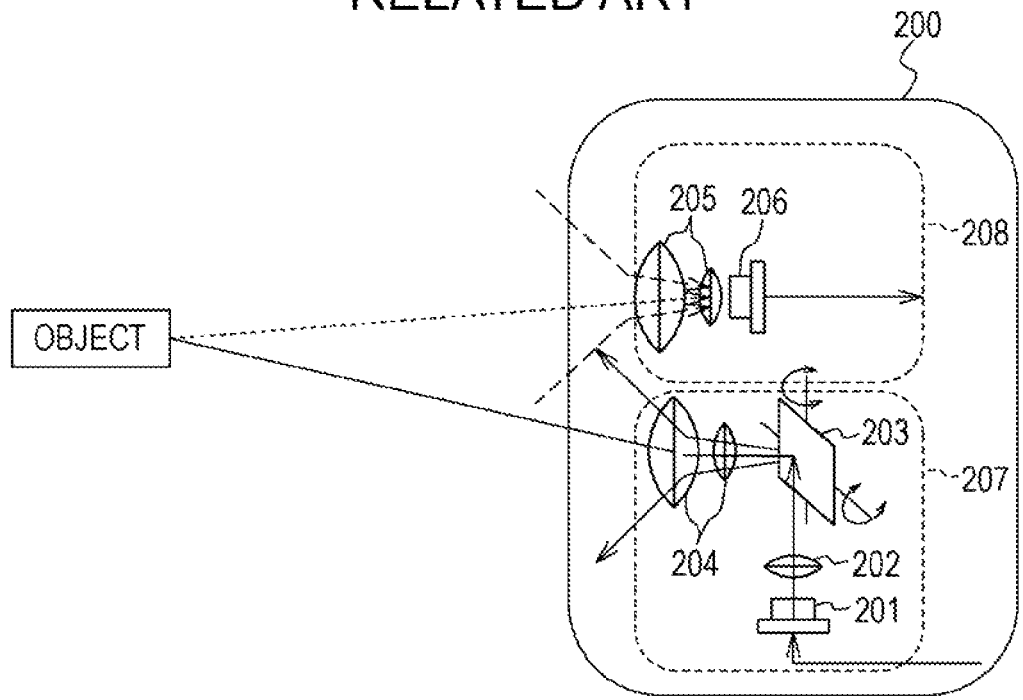
FIG. 1A is a schematic diagram of a distance measuring apparatus according to a comparative example.

FIG. 1A is a schematic diagram of a distance measuring apparatus 200 according to a comparative example. As exemplified in FIG. 1A, the distance measuring apparatus 200 includes a light-emitting element 201, a collimator lens 202, a scanning mirror 203, an angle increasing lens 204, a condenser lens 205, a photodetector 206, and the like. The light-emitting element 201, the collimator lens 202, the scanning mirror 203, and the angle increasing lens 204 are included in an emitting optical system 207. The condenser lens 205 and the photodetector 206 are included in an incident optical system 208.

The light-emitting element 201 emits a laser pulse. The collimator lens 202 suppresses expanding of the laser pulse, which is emitted from the light emitting element 201, and makes the laser pulse as substantially parallel light. The scanning mirror 203 deflects the parallel light emitted from the collimator lens 202, in terms of angle in a horizontal direction and a vertical direction. The angle increasing lens 204 further increases the angle of the light deflected by the scanning mirror 203. A projection angle is defined as an angle between the optical axis of the angle increasing lens 204 and the travelling direction of the laser pulse. The laser pulse emitted from the angle increasing lens 204 is radiated on an object targeted for distance measurement, scattered (reflected), and returned to the condenser lens 205. This optical feedback is concentrated in the condenser lens 205 and received by the photodetector 206.

Figure 1B:
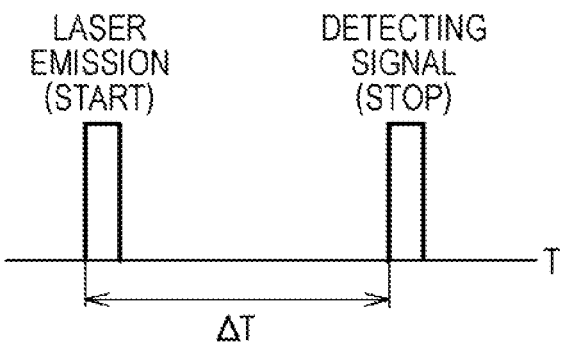
FIG. 1B is an explanatory diagram of a time of flight (TOF) method.

The distance measuring apparatus 200 employs the time of flight (TOF) method for measuring a distance to the object. FIG. 1B is an explanatory diagram of the TOF method. As exemplified in FIG. 1B, the distance measuring apparatus 200 measures a round-trip time ($\Delta T$) between emission of the laser pulse from the light-emitting element 201 and reception of the optical feedback from the object. Then, the distance measuring apparatus 200 calculates the distance to the object by multiplying the measured round-trip time by the speed of light.

FIG. 2A exemplifies a case where a lens with a small enlargement factor is used as the angle increasing lens 204 and a narrow-angle lens is used as the condenser lens 205. As exemplified in FIG. 2A, when an area to be measured is narrow, it is still possible to measure the distance to the object using the narrow-angle lens. In this case, since an incident area on the condenser lens 205 becomes narrow, it is possible to suppress noise light incident on the condenser lens 205. Thereby, it is possible to obtain a good S/N ratio.

For such a distance measuring apparatus, a desire for increasing a measurement range for measuring the object is expected to rise. Thus, as exemplified in FIG. 2B, a lens with a large enlargement factor is considered to be used as the angle increasing lens 204 and a wide-angle lens is considered to be used as the condenser lens 205. As exemplified in FIG. 2B, the area to be measured may be enlarged by using the wide-angle lens. However, since the incident area on the condenser lens 205 becomes wide, the noise light incident on the condenser lens 205 increases. The S/N ratio accordingly decreases. To solve this problem, there is a desire for a distance measuring apparatus that is capable of suppressing the noise light while having a wide angle property of the condenser lens.

Figure 3A:
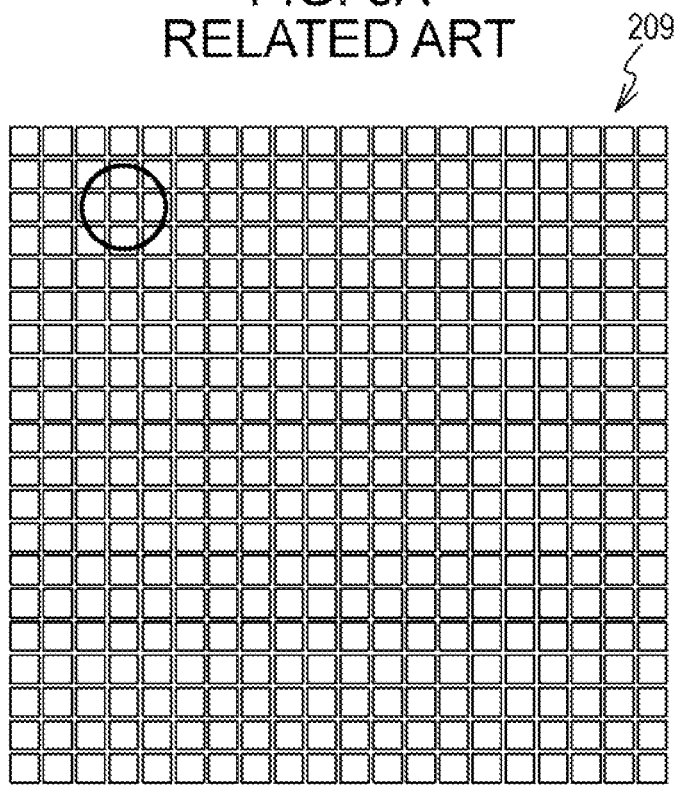
FIG. 3A is a diagram exemplifying a photodetector array.
Figure 3B:
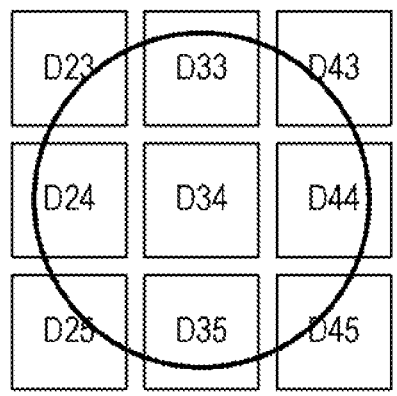
FIG. 3B is a diagram illustrating an enlarged area on which optical feedback is incident.

One conceivable solution is to use a photodetector array 209 including multiple photodetectors arranged on one plane as exemplified in FIG. 3A. FIG. 3B is a diagram illustrating an enlarged area on which the optical feedback is incident. Reference numerals used in FIG. 3B are channel numbers that are allocated to the respective photodetectors. For example, as exemplified in FIG. 3C, an output of a photodetector in which the center of the optical feedback (a centroid of the projection area) is positioned and outputs of other photodetectors adjacent to the photodetector are considered to be used.

Figure 4A:
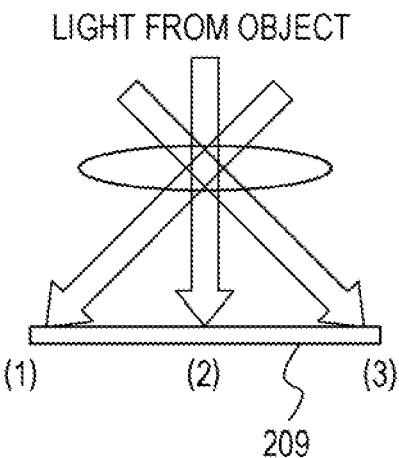
FIG. 4A is a diagram exemplifying angles of incidence to the condenser lens.

Here, a relation between the angle of incidence of the optical feedback to the condenser lens 205 and the incident area of the optical feedback on the photodetector array 209 will be described. FIG. 4A is a diagram exemplifying angles of incidence of the optical feedback to the condenser lens 205. As exemplified in FIG. 4A, incident light (1) and incident light (3) are each slanting and incident on a condensing surface of the condenser lens 205. In other words, each incident angle of view is large. On the other hand, incident light (2) is vertically incident on the condensing surface of the condenser lens 205. In other words, the incident angle of view is small.

Figure 3C:
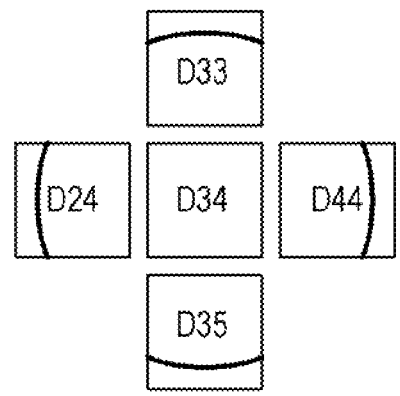
FIG. 3C is a diagram exemplifying selected photodetectors.
Figure 4B:
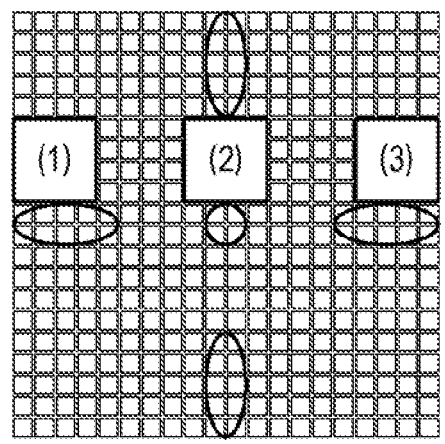
FIG. 4B is a diagram exemplifying incident areas on the photodetector array.
Figure 5:
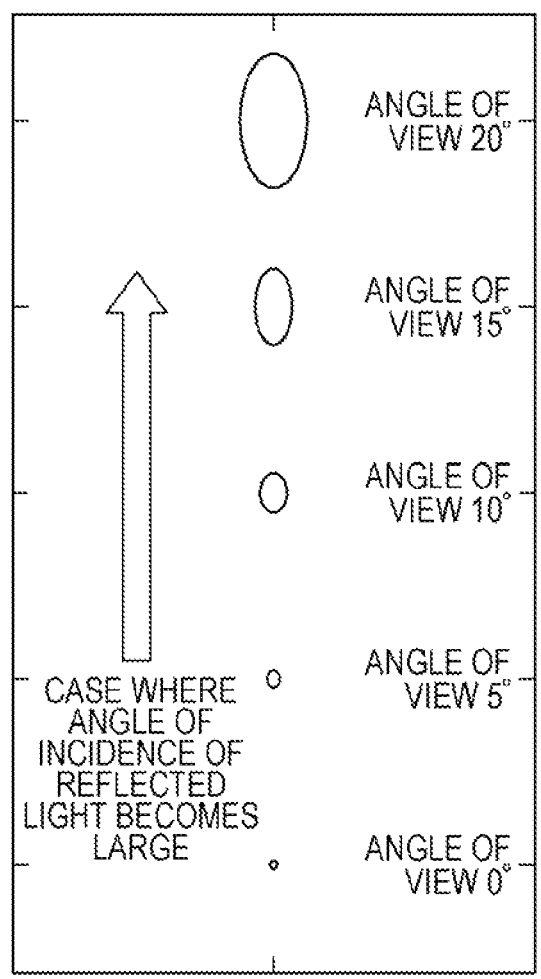
FIG. 5 is a diagram exemplifying a relationship between the incident angle of view and the incident area.

FIG. 4B is a diagram exemplifying incident areas on the photodetector array 209. As exemplified in FIG. 4B, when the incident angle of view is small as in the case of the incident light (2), the incident area on the photodetector array 209 becomes small. On the other hand, when the incident angle of view is large as in the cases of the incident light (1) and (3), a distortion occurs in the incident area because of aberrations of the condenser lens 205. Consequently, the incident area on the photodetector array 209 becomes large. When only the outputs with the area described with reference to FIG. 3C are used for this case, an amount of received light is not sufficiently obtained and thereby the S/N ratio deteriorates. As exemplified in FIG. 5, this deterioration tends to be obvious as the incident angle of view becomes large. In response, the following embodiments describe a distance measuring apparatus, a distance measuring method, a distance measuring program, and a table creating method, which improve the accuracy of selecting a photodetector of a photodetector array.

First Embodiment

Figure 6A:
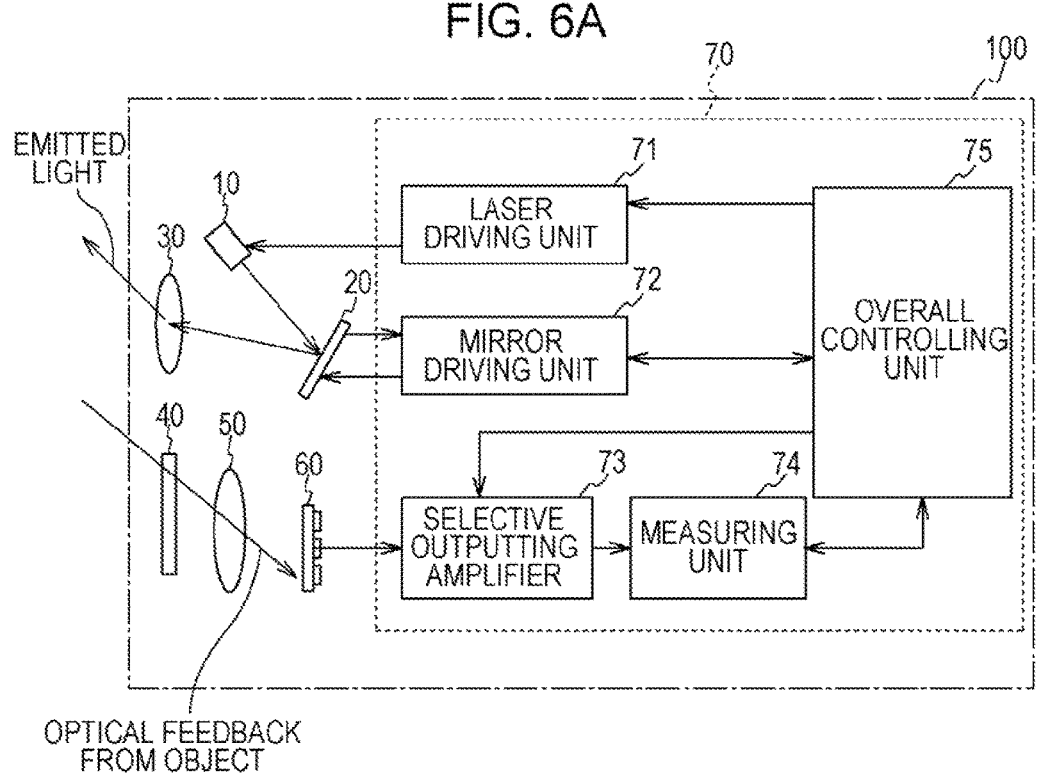
FIG. 6A is a schematic diagram illustrating an overall configuration of a distance measuring apparatus according to a first embodiment.

FIG. 6A is a schematic diagram illustrating an overall configuration of a distance measuring apparatus 100 according to a first embodiment. As exemplified in FIG. 6A, the distance measuring apparatus 100 includes a light emitter 10, a scanning mirror 20, an angle increasing lens 30, a band-pass filter 40, a condenser lens 50, a photodetector array 60, a controller 70, and the like. The controller 70 includes a laser driving unit 71, a mirror driving unit 72, a selective outputting amplifier 73, measuring unit 74, and an overall controlling unit 75.

The light emitter 10 is a device that emits laser beam according to an instruction from the laser driving unit 71, and includes a light-emitting element such as a laser diode. The light emitter 10 emits pulsed laser beam at a predetermined cycle, for example. The overall controlling unit 75 controls the laser driving unit 71. A timing for the laser driving unit 71 to instruct the light emitter 10 to emit the pulsed laser beam is sent to the measuring unit 74 from the overall controlling unit 75. In other words, the measuring unit 74 receives the timing of emitting the pulsed laser beam. Additionally, the light emitter 10 includes a collimator lens that suppresses expansion of the pulsed laser beam and makes the pulsed laser beam a substantially parallel light.

The scanning mirror 20 is a mirror that changes an angle of the laser beam emitted in three dimensions. The scanning mirror 20 three-dimensionally changes the angle of the laser beam to be emitted, by changing a rotation angle in horizontal plane and a rotation angle in vertical plane, for example. Hereinafter, the rotation angle in horizontal plane is referred to as a horizontal angle H and the rotation angle in vertical plane is referred to as a vertical angle V. It is possible to use a mirror such as a micro electro mechanical system (MEMS) mirror or a galvano mirror as the scanning mirror 20. The overall controlling unit 75 indicates to the mirror driving unit 72 the horizontal angle H and the vertical angle V to move the scanning mirror 20. The mirror driving unit 72 drives the scanning mirror 20 to form the indicated angles. The pulsed laser beam emitted from the light emitter 10 is deflected depending on the horizontal angle H and the vertical angle V of the scanning mirror 20.

A projection angle is defined as an angle between the optical axis of the angle increasing lens 30 and the travelling direction of the laser pulse. The angle increasing lens 30 further increases the angle of the light deflected at the scanning mirror 20. Scanning of the scanning mirror 20 changes the angle of incidence of the laser beam to the angle increasing lens 30. The projection angle corresponds to the angle between a travelling direction of the pulsed laser beam emitted from the angle increasing lens 30 and an optical axis of the angle increasing lens 30. The pulsed laser beam emitted from the angle increasing lens 30 is radiated on the object, scattered (reflected), going through the band-pass filter 40, and returned to the condenser lens 50. This optical feedback is concentrated in the condenser lens 50 and received by the photodetector array 60. The band-pass filter 40 selectively allows the portion of the optical feedback in a wavelength band of the pulsed laser beam emitted from the light emitter 10 to pass. Consequently, it is possible to suppress the noise light incident on the photodetector array 60.

Figure 6B:
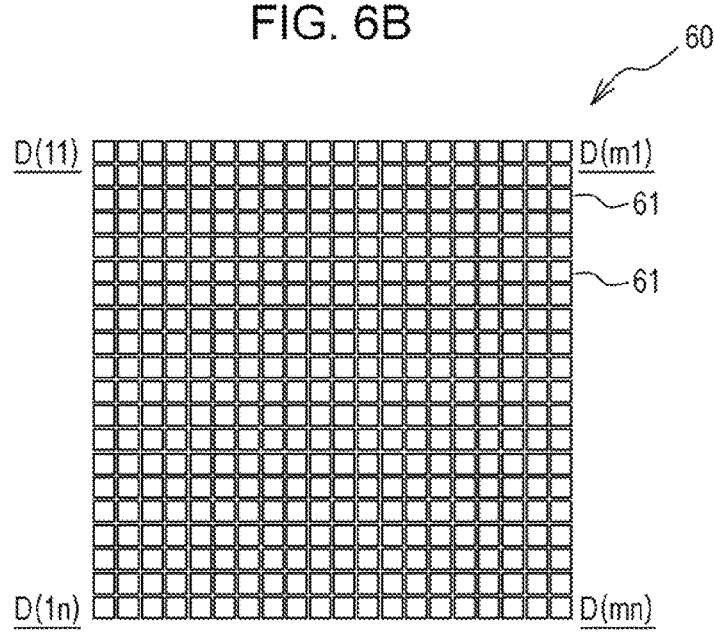
FIG. 6B is a diagram exemplifying a photodetector array.

FIG. 6B is a diagram exemplifying the photodetector array 60. As xemplified in FIG. 6B, the photodetector array 60 includes a structure in which multiple photodetectors 61 are arranged on a surface of its substrate. For example, the photodetector array 60 includes a structure in which 20×20 of the photodetectors 61 are arranged with a grid pattern on the surface of the substrate. A channel of the photodetector 61 on the upper left in FIG. 6B is defined as D(1, 1) and its coordinates are defined as (−10, 10). A channel of the photodetector 61 on the upper right is defined as D(m, 1), m=20, and its coordinates are defined as (10, 10). A channel of the photodetector 61 on the lower left is D(1, n), n=20, and its coordinates are defined as (−10, −10). A channel of the photodetector 61 on the lower right is D(m, n), m=20, n=20, and its coordinates are (10, −10).

The overall controlling unit 75 selects one or more photodetectors 61 from the photodetectors 61 on the photodetector array 60. Then, the overall controlling unit 75 indicates information on the selected photodetector 61 to the selective outputting amplifier 73. The selective outputting amplifier 73 amplifies an electric signal (photocurrent) outputted from the indicated photodetector 61 and outputs the electric signal to the measuring unit 74. Electric signals of unselected photodetectors 61 are not inputted to the measuring unit 74. In this way, the selective outputting amplifier 73 switches the photodetectors 61 between on and off.

In the present embodiment, the overall controlling unit 75 selects the channel depending on the horizontal angle H and the vertical angle V indicated to the mirror driving unit 72. The horizontal angle H and the vertical angle V of the scanning mirror 20 may be detected by using a device such as an angle detector. First, a direction as a projection angle of the laser beam emitted from the angle increasing lens 30 is determined based on the horizontal angle H and the vertical angle V indicated to the mirror driving unit 72. Once the projection angle is determined, the incident angle of view from the object to the condenser lens 50 is also determined. In addition, once the incident angle of view to the condenser lens 50 is determined, the area on the photodetector array 60 on which the pulsed laser beam is radiated is also determined. The area is determined by taking into consideration the aberrations of the condenser lens 50. Hence, the irradiated area becomes narrow when the incident angle of view to the condenser lens 50 is small, and the irradiated area becomes wide due to the distortion when the incident angle of view is large. For example, the overall controlling unit 75 selects the channel such that the whole irradiated area is included. Hence, the number of selected channels becomes small when the incident angle of view to the condenser lens 50 is small, and the number of selected channels becomes large when the incident angle of view is large. For example, the number of selected channels gradually increases as the horizontal angle H or the vertical angle V increases from zero to a larger number. In addition, when both the horizontal angle H and the vertical angle V increase, the number of selected channels increases more than in a case where only one of the horizontal angle H and the vertical angle V increases. By virtue of selecting the channel depending on the horizontal angle H and the vertical angle V indicated to the mirror driving unit 72, the accuracy of selecting the photodetector is improved, and the accuracy of detecting the amount of received light is improved while suppressing detection of the noise light, and it is possible to suppress the deterioration of the S/N ratio.

Figures 7A, 7B:
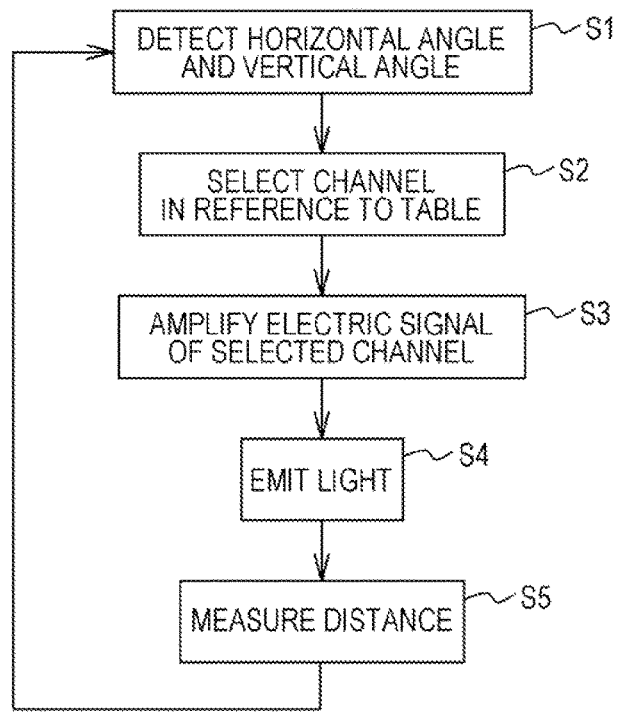
FIG. 7A exemplifies a table that stores relationships among a horizontal angle, a vertical angle, and photodetectors to be selected.
FIG. 7B is a flowchart illustrating a specific example of an operation of the distance measuring apparatus.

FIG. 7A exemplifies a table that stores relationships among the horizontal angle H, the vertical angle V, and the photodetectors 61 to be selected. In the table in FIG. 7A, the channels to be selected by the overall controlling unit 75 are related to the horizontal angle H and the vertical angle V.

The measuring unit 74 employs the time of flight (TOF) method and measures the distance to the object. First, the measuring unit 74 calculates a timing of a return of the optical feedback from the object based on a time when the photocurrent outputted by the selective outputting amplifier 73 becomes equal to or over the threshold. In this case, a time between when the optical feedback is incident on the photodetector array 60 and when the photocurrent is inputted to the measuring unit 74 is considered. Next, the measuring unit 74 calculates the round-trip time ΔT based on the timing of emission, which is received from the laser driving unit 71, and the timing of the return of the optical feedback. The measuring unit 74 calculates the distance to the object by multiplying a half of the round-trip time ΔT by the speed of light.

FIG. 7B is a flowchart illustrating a specific example of an operation of the distance measuring apparatus 100. As exemplified in FIG. 7B, the overall controlling unit 75 detects the horizontal angle H and the vertical angle V of the mirror driving unit 72 (step S1). When the angle detector is not used, the horizontal angle H and the vertical angle V to be indicated to the mirror driving unit 72 may be used. Next, the overall controlling unit 75 selects a light-receiving channel corresponding to the indicated horizontal angle H and vertical angle V with reference to the table in FIG. 7A (step S2). Then, the selective outputting amplifier 73 amplifies the electric signal of the light-receiving channel selected in step S2 (step S3). Next, the overall controlling unit 75 instructs the laser driving unit 71 to cause the light emitter 10 to emit the pulsed laser beam (step S4). Then, the measuring unit 74 calculates the round-trip time ΔT based on the timing of emission, which is received from the laser driving unit 71, and the timing of the return of the optical feedback, and subsequently calculates the distance to the object (step S5).

According to the present embodiment, the distortion of the area irradiated with pulsed laser beam on the photodetector array 60, which occurs when the projection angle of the pulsed laser beam is large, is taken into account for selection of the photodetector 61 from the photodetector array 60. Hence, the accuracy of selecting the photodetector 61 improves even when using the wide-angle lens for each of the angle increasing lens 30 and the condenser lens 50. In addition, since the photodetector 61 related to the irradiated area is selected, it is possible to suppress the noise. Accordingly, it is possible to provide the distance measuring apparatus that is capable of suppressing the deterioration of the S/N ratio while keeping the wide angle.

ANOTHER TABLE EXAMPLE 1

A table that the selective outputting amplifier 73 refers to is not limited to the table in FIG. 7A. For example, based on the horizontal angle H and the vertical angle V, it is possible to find the centroid position of the irradiated area of the laser beam on the photodetector array 60. Thus, only a channel of the centroid position as a representative position and information on surrounding channels may be stored. For example, as exemplified in FIG. 8, the centroid position of the irradiated area and an area around the irradiated area as a selectable area may be stored. As a result, information on channels to be off does not have to be stored, and thus it is possible to decrease volume of the table.

ANOTHER TABLE EXAMPLE 2

Figures 9A, 9B:
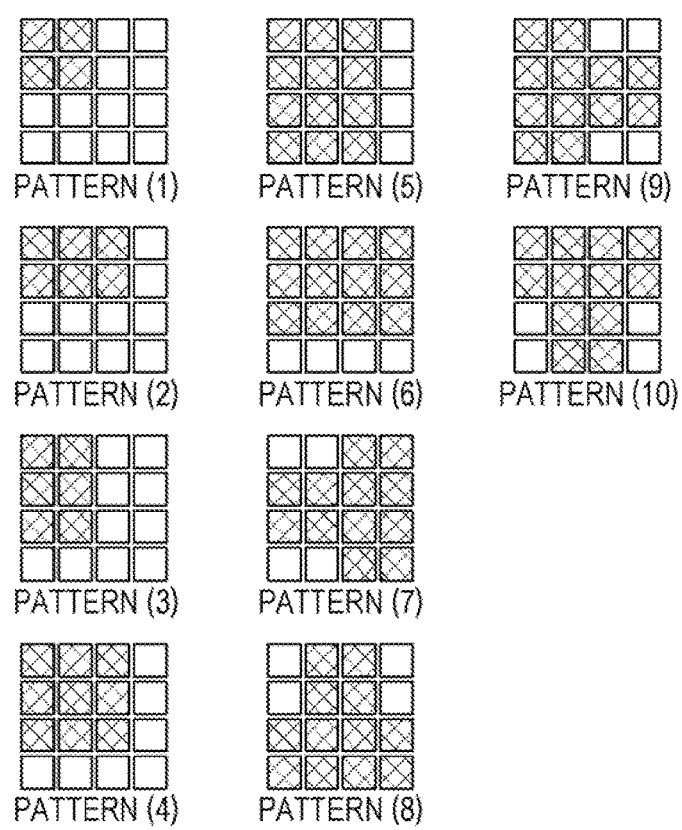
FIG. 9A is a diagram exemplifying another example of the table.
FIG. 9B is a diagram exemplifying each of shape patterns of an incident area.

As exemplified in FIG. 9A, the channel of the centroid position obtained based on the horizontal angle H and the vertical angle V, and a shape pattern of the irradiated area corresponding to the horizontal angle H and the vertical angle V may be stored in the table. FIG. 9B exemplifies the shape patterns. As a result, the information on channels to be off may not be stored, and thus it is possible to decrease volume of the table.

ANOTHER TABLE EXAMPLE 3

As exemplified in FIGS. 10A, 10B, and 11, instead of the horizontal angle H and the vertical angle V, a number, as a laser beam emission count, corresponding to each angle (laser beam emission count) may be stored.

[Example of Dividing Light-receiving Surface]

Figure 12:
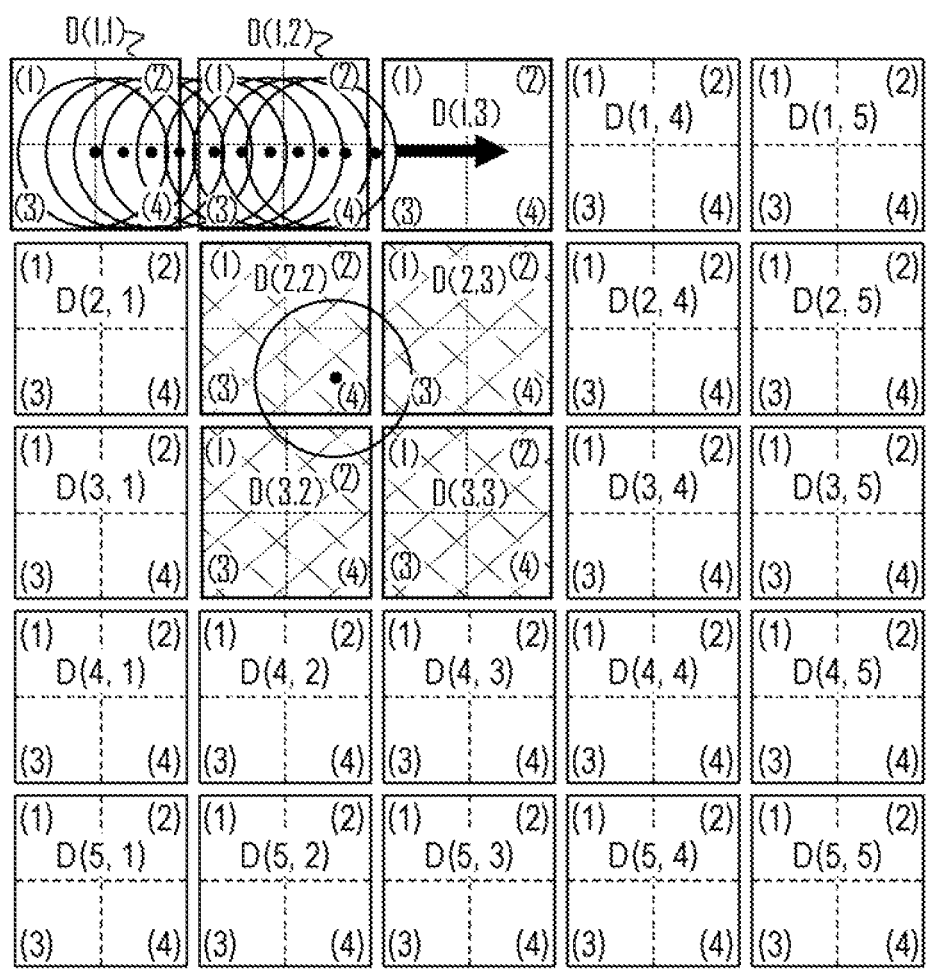
FIG. 12 is a diagram exemplifying an example of dividing a light receiving surface of each photodetector to multiple virtual regions.

With dividing the light-receiving surface of the each photodetector 61 in multiple virtual regions, a channel may be selected depending on a region in which the centroid position of the irradiated area is positioned. For example, as exemplified in FIG. 12, when the light-receiving surface of the photodetector 61 has a rectangular shape, the light-receiving surface may be divided into four virtual rectangles such as regions (1) to (4). In the example in FIG. 12, when the centroid position of the irradiated area is positioned in the region (4) of a channel D (2, 2), the irradiated area covers a channel D (2, 3), a channel D (3, 2), and a channel D (3, 3). In this case, when the centroid position of the irradiated area is positioned in the region 4 of the channel D (2, 2), the channels D (2, 2), D (2, 3), (3, 2), and (3, 3) are selected. Using an optical simulator or the like, it is possible to estimate beforehand the region in which the centroid position of the irradiated area is positioned. Otherwise, the horizontal angle H, the vertical angle V, and the centroid position may be obtained when the light emitter 10 actually emits the light.

Note that in a case where the angle of the scanning mirror 20 is continuously changed, when the pulsed laser beam is emitted from the light emitter 10 in short time intervals, multiple centroid positions of the pulsed laser beam are positioned in one photodetector 61. In other words, the number of light emitting points becomes larger than that of the photodetectors. This case is illustrated in the upper left of FIG. 12 where multiple shifting circles are illustrated. Here, multiple positions for the centroid positions of the irradiated area appear on the light-receiving surface of one photodetector 61. In such a case, with using the above mentioned virtual regions that are virtually divided, it is possible to accurately detect optical intensity even when the multiple centroid positions are on one photodetector 61.

[Distance between Photodetectors 61]

Figure 13A:
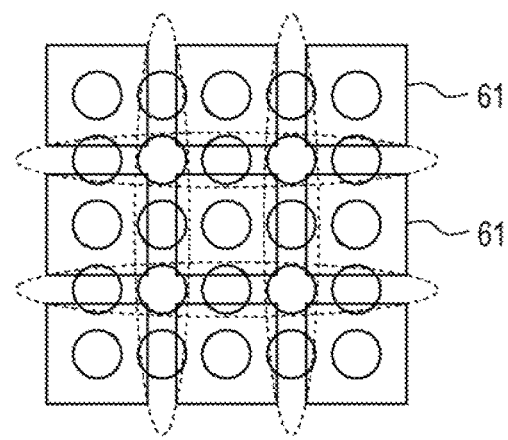
FIGS. 13A to 13D are diagrams for explaining the smallest beam diameter.

A possible way of enhancing resolution is to increase the number of data. The number of data is defined as the number of combinations of the horizontal angle H and the vertical angle V. In other words, increasing the number of data corresponds to the fact that the pulsed laser beam is emitted at each of the horizontal angle H and the vertical angle V which are changed at small intervals of angle. When the intervals of angle are decreased, the centroid of the irradiated area of the pulsed laser beam may be positioned in a light insensitive region (region where the photocurrent is not obtained) between the photodetectors 61. In this case, a level of the photocurrent outputted from the photodetector 61 may be decreased and consequently a desired optical intensity may not be detected. For example, a signal level may be decreased in the irradiated area surrounded by a dashed line in FIG. 13A.

Figure 13B:
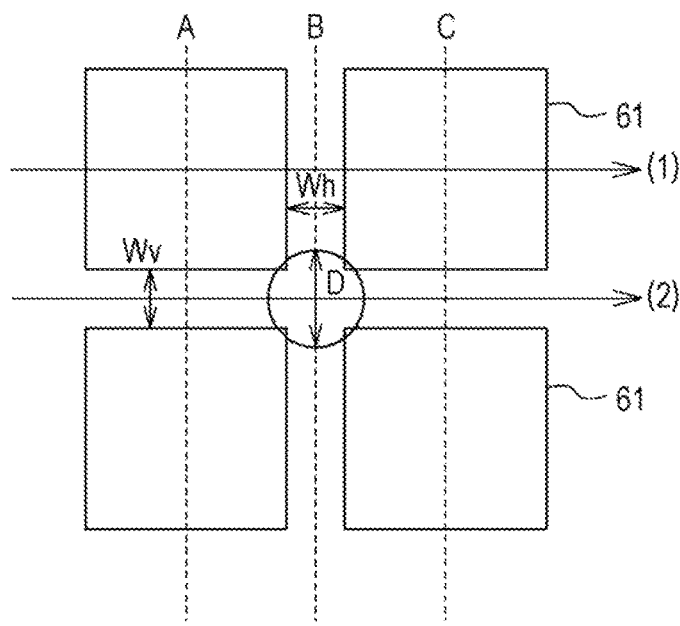

In response, by making a following relationship between a size of the irradiated area of the pulsed laser beam on the photodetector array 60 and a width of the light insensitive region between the photodetectors 61, the accuracy of detecting the optical intensity may be improved. First, as exemplified in FIG. 13B, it is assumed that each photodetector 61 has the rectangular shape, sides of the photodetector 61 are parallel and facing each other, and the irradiated area has a substantially circular shape. In this case, the smallest beam diameter of the irradiated area is denoted by D. A width of a gap between the photodetectors 61 in the horizontal direction is denoted by Wh, and a width of a gap between the photodetectors 61 in the vertical direction is denoted by Wv. The widths Wh and Wv each correspond to a width of the insensitive region.

The center of the four photodetectors 61 adjacent to each other is a point that has the shortest distance from corners, which are the closest to each other, of the four photodetectors 61. When the centroid of the irradiated area of the laser beam is positioned in the center and at least a part of the irradiated area is included in any of the four photodetectors 61, it is possible to inhibit disappearance of the signal. Specifically, the following formula is to be satisfied:

$$\sqrt{(W_v^2 + W_h^2)} < D \qquad (1)$$

Figure 13C:
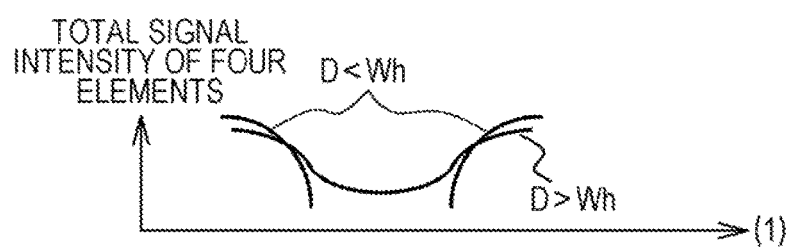
Figure 13D:
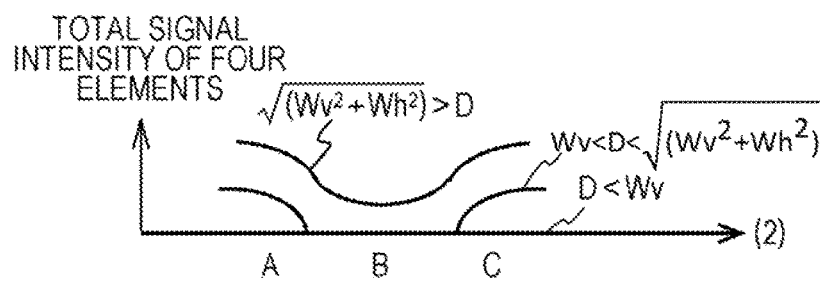

FIGS. 13C and 13D illustrate total outputted current of the above-mentioned four photodetectors 61 when the centroid of the irradiated area moves in the horizontal direction in such a way as to go through the above-mentioned center. As exemplified in FIGS. 13C and 13D, when the above formula (1) is satisfied, the photocurrent is outputted regardless of the position of the centroid. Note that, as described above, since the irradiated area becomes larger as the incident angle of view to the condenser lens 50 becomes larger, the above formula (1) may be satisfied with the incident angle of view to the condenser lens 50 of zero degrees or a value that is close to zero.

Second Embodiment

[Table Creating Method]

Next, a table creating method will be described. For example, using the optical simulator, the irradiated area on the photodetector array 60 for various horizontal angles H and various vertical angles V is calculated. Then, a channel including at least a part of the irradiated area is obtained. The obtained channel is stored in the table while being associated with the horizontal angle H and the vertical angle V. The aberrations of the condenser lens 50 is considered for calculating the irradiated area. According to the above steps, it is possible to create the table.

Figure 14:
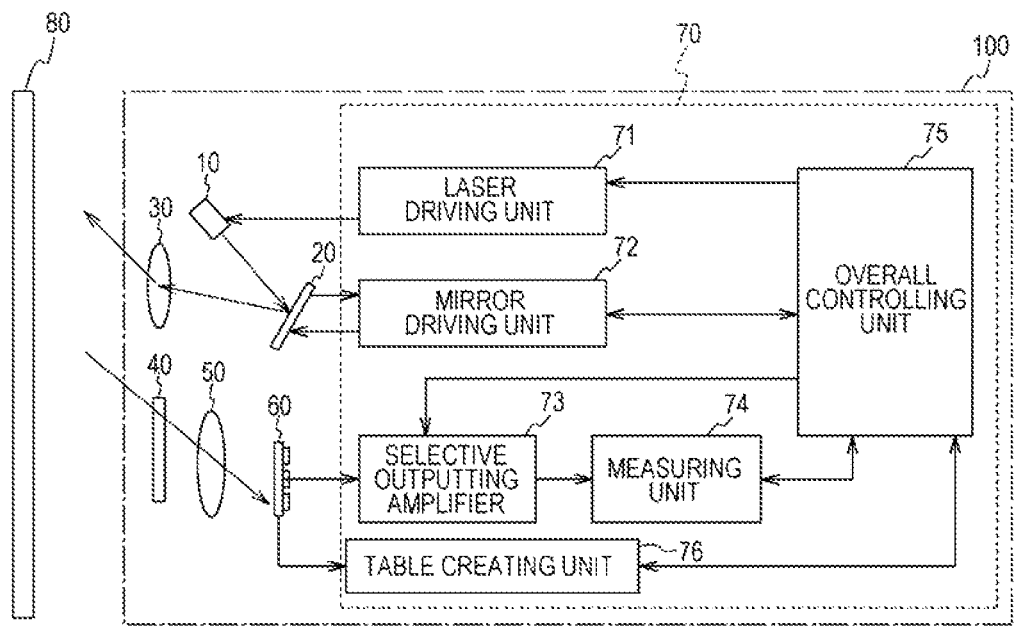
FIG. 14 is a diagram exemplifying a table creating method.

Otherwise, the table may be created by measurement using an actual distance measuring apparatus. For example, as exemplified in FIG. 14, a screen 80 is placed with a proper distance from the angle increasing lens 30. The screen 80 may be created with a white Kent paper, for example. The photodetector array 60 detects light reflected from the screen 80. In this way, the noise light incident on the condenser lens 50 is suppressed. In addition, when the table is created using the actual distance measuring apparatus 100, it is possible to create a table which includes influence caused by the condenser lens 50 and a collimation error. The distance measuring apparatus 100 has a function of a table creating unit 76.

Figure 15:
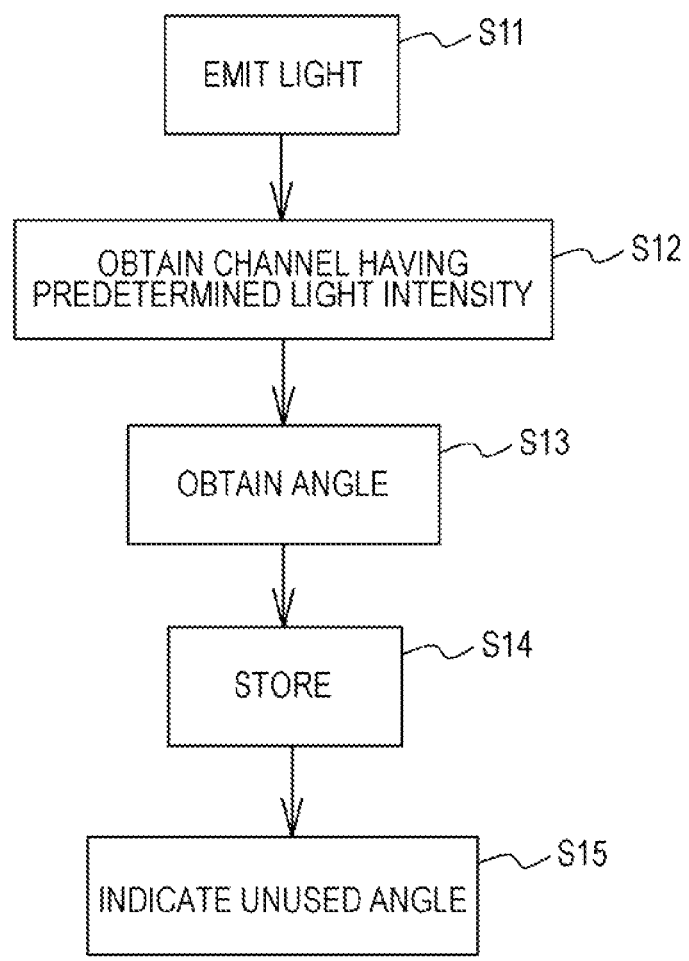
FIG. 15 is an example of a flowchart illustrating the table creating method.

FIG. 15 is an example of a flowchart illustrating the table creating method using the screen 80. As exemplified in FIG. 15, the laser driving unit 71 causes the light emitter 10 to emit pulse laser beam (step S11). Then, from the photodetector array 60, the table creating unit 76 obtains the channel of the photodetector 61 that detects the predetermined optical intensity (step S12).

Next, the table creating unit 76 obtains the horizontal angle H and the vertical angle V indicated by the overall controlling unit 75 to the mirror driving unit 72 (step S13). Then, the table creating unit 76 stores the horizontal angle H and the vertical angle V obtained in step S13 while associating the angles with the channel obtained in step S12 (step S14). Next, the overall controlling unit 75 indicates unused horizontal angle H and vertical angle V to the mirror driving unit 72 (step S15). After that, the table creating method is repeatedly executed until all of the horizontal angles H and the vertical angles V are used.

Third Embodiment

For the band-pass filter 40, a transparent substrate (glass substrate) with one or both sides on which an optical multilayer film is formed may be used. Incidence of light with wavelengths different from that of the laser beam of the light emitter 10 is suppressed by using the band-pass filter 40. In other words, it is possible to suppress the noise light. By changing an angle of such band-pass filter 40, it is possible to make a further change on a wavelength characteristic (a wavelength of light to be transmitted).

Thus, when the wavelength of laser beam which is emitted from the light emitter 10 is changed due to a temperature change, the wavelength characteristic of the band-pass filter 40 is preferably changed for allowing the laser beam with the changed wavelength to be transmitted through the band-pass filter 40. However, an optical axis shifts based on Snell's law when an inclined angle of the band-pass filter 40 is changed. In other words, the irradiated area on the photodetector array 60 shifts. Hence, corresponding to the temperature of the light emitter 10, the selected channel of the selective outputting amplifier 73 may be corrected.

Figure 16A:
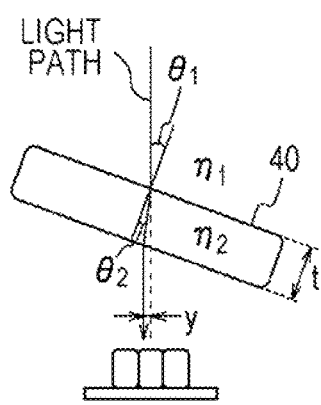
FIG. 16A is a diagram exemplifying Snell's law.

First, Snell's law will be described. FIG. 16A is a diagram illustrating Snell's law. A refractive index of the air is denoted by $n_1$. A refractive index of the band-pass filter 40 is denoted by $n_2$. A thickness of the band-pass filter 40 is denoted by t. When the laser beam passed along a predetermined light path passes through the band-pass filter 40 and is incident on the photodetector array 60, it is assumed that an angle of incidence of the laser beam to the band-pass filter 40 only shifts by $\theta_1$, and an emitting angle of the laser beam from the band-pass filter 40 only shifts by $\theta_2$. In this case, $n_1 \sin \theta_1 = n_2 \sin \theta_2$ is satisfied. In addition, since the refractive index $n_1$ is a refractive index of the air, $n_1=1$. Thus, $\sin \theta_2 = (\sin \theta_1)/n_2$ is satisfied. Accordingly, it is possible to obtain the following formula (2) from these equations. Moreover, a shifting amount y of light concentration position on the photodetector array 60 may be expressed as the following formula (3) using the following formula (2).

$$\cos\theta_2 = \sqrt{1 - \frac{1}{n_2^2}\sin^2\theta_1} \qquad (2)$$

$$y = t\left(\sin\theta_1 - \cos\theta_1 \frac{\sin\theta_1}{\cos\theta_2}\right) \qquad (3)$$

Figure 16B:
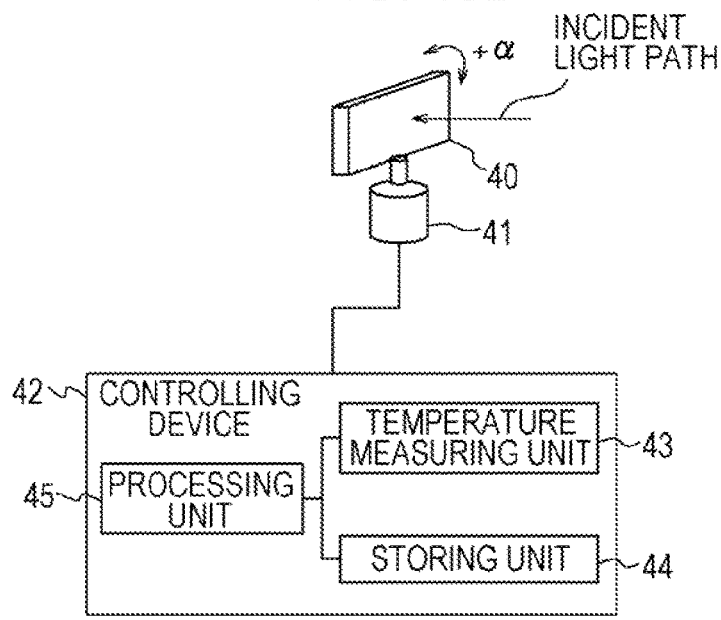
FIG. 16B is a diagram illustrating a configuration for correcting a selected channel by using Snell's law.

FIG. 16B is a diagram illustrating a configuration for correcting the selected channel by using Snell's law. As exemplified in FIG. 16B, the band-pass filter 40 is provided with a stepping motor 41 as a rotation device for changing an inclined angle of the optical multilayer film. In addition, the band-pass filter 40 includes a controlling device 42. The controlling device 42 includes a temperature measuring unit 43, a storing unit 44, and a processing unit 45.

The temperature measuring unit 43 is a temperature sensor or the like for measuring temperature of the light-emitting element of the light emitter 10. The storing unit 44 is a memory or the like for storing a rotation amount (rotation angle) of the stepping motor 41 in association with the temperature of the light-emitting element. The processing unit 45 reads out the rotation angle corresponding to the temperature measured by the temperature measuring unit 43 from the storing unit 44, and controls the stepping motor 41 in such a way as to achieve the rotation angle. Depending on the rotation angle, the processing unit 45 also corrects the centroid position of the irradiated area on the photodetector array 60 by using the above-mentioned Snell's law. The selective outputting amplifier 73 reads out a channel associated with the corrected centroid position from the table. In this way, the selective outputting amplifier 73 may select the channel of the photodetector array 60 in accordance with the change in the wavelength characteristic of the band-pass filter 40.

ANOTHER EXAMPLE

Figure 17:
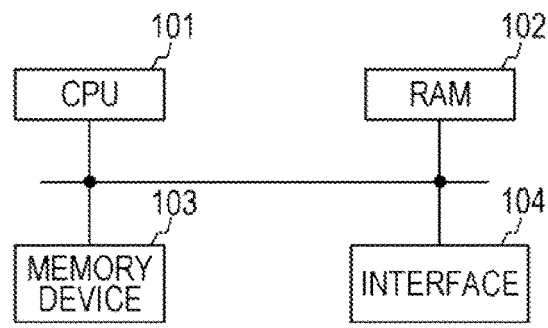
FIG. 17 is a block diagram for explaining another hardware configuration of an overall controlling unit.

FIG. 17 is a block diagram for explaining another hardware configuration of the overall controlling unit 75. Referring to FIG. 17, the overall controlling unit 75 includes a central processing unit (CPU) 101 as a processor, a random access memory (RAM) 102, a memory device 103, and an interface 104. These devices are connected to each other via a bus and the like. The CPU 101 is a device for central processing. The CPU 101 includes one or more cores. The RAM 102 is a volatile memory that temporarily stores a program executed by the CPU 10, data processed by the CPU 101, and the like. The memory device 103 is a non-volatile memory device. For example, as the memory device 103, a read only memory (ROM), a solid state drive (SSD) such as a flash memory, a hard disk driven by a hard disk drive, and the like are available. The overall controlling unit 75 is implemented in the distance measuring apparatus 100 by the distance measuring program executed by the CPU 101. Otherwise, the overall controlling unit 75 and the table creating unit 76 may be implemented in the distance measuring apparatus 100 by the distance measuring program executed by the CPU 101.

In the above-described examples, the light emitter 10, the scanning mirror 20, and the angle increasing lens 30 function as an example of a projector that projects laser beam. The photodetector array 60 functions as an example of a photodetector array in which multiple photodetectors are arranged. The condenser lens 50 functions as an example of a condenser lens that concentrates light on the photodetector array. The measuring unit 74 functions as an example of a detecting unit or detector that detects an output of one or more photodetectors of the photodetector array. The overall controlling unit 75 functions as an example of a selecting unit or selector that selects a photodetector from which the detecting unit is to receive the output, depending on the angle of incidence of the reflected light to the condenser lens, the reflected light being caused by while taking into account a distortion of the area on the photodetector array irradiated with the laser beam projected at a large projection angle.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distance measuring apparatus comprising:
    a projector configured to project laser beam at a projection angle to an object, in response to an indication to control the projection angle;
    a photodetector array in which a plurality of photodetectors are arranged;
    a condenser lens configured to concentrate, on the photodetector array in a direction corresponding to the projection angle, a reflected laser beam reflected by the object;
    a detector configured to detect an output of at least one of the photodetectors of the photodetector array; and
    a processor configured to select the at least one photodetector from which the detector receives the output, depending on a distortion of an area on the photodetector array irradiated with the reflected laser beam in accordance with the indication to control the projection angle,
    the area determinable by an angle of incidence of the reflected laser beam to the condenser lens, the angle of incidence corresponding to the projection angle.

2. The distance measuring apparatus according to claim 1, wherein the processor is to select the at least one photodetector based on a centroid position of the irradiated area in accordance with the indication to control the projection angle.

3. The distance measuring apparatus according to claim 2, wherein the selector divides a light-receiving surface of each photodetector into a plurality of virtual regions, and selects the at least one photodetector depending on a region in which the centroid position is located among the plurality of regions.

4. The distance measuring apparatus according to claim 1, further comprising:
    a band-pass filter that selectively transmits the reflected laser beam in accordance with an incidence of light with a wavelength.

5. The distance measuring apparatus according to claim 4, wherein
    the band-pass filter includes an optical multilayer film and selectively transmits the reflected laser beam in accordance with the wavelength of the incidence of light by adjusting an angle of the optical multilayer film depending on a change of a wavelength of the laser beam.

6. The distance measuring apparatus according to claim 5, wherein the processor is to further select the at least one photodetector depending on the angle of the optical multilayer film.

7. The distance measuring apparatus according to claim 1, wherein
    the photodetector array has a structure in which the photodetectors in a rectangular shape are arranged on grid points on a plane formed by two axes that are perpendicular to each other, and
    a minimum value of a beam diameter of the reflected laser beam incident on the photodetector array is greater than a square root of $(Wv^2+Wh^2)$, where distances between the photodetectors in respective directions of the two axes are Wv and Wh.

8. A distance measuring method to be implemented by a distance measuring apparatus provided with:
    a projector that project laser beam at a projection angle to an object, in response to an indication to control the projection angle;
    a photodetector array in which a plurality of photodetectors are arranged on a plane thereof;
    a condenser lens that concentrates on the photodetector array in a direction corresponding to the projection angle, a reflected the laser beam reflected from the object; and
    a detector that detects an output of at least one of the photodetectors of the photodetector array, the distance measuring method comprising:
    selecting, by a processor, the at least one photodetector from which the detector receives the output, depending on a distortion of an area on the photodetector array irradiated with the reflected laser beam in accordance with the indication to control the projection angle,
    the area determinable by an angle of incidence of the reflected laser beam to the condenser lens, the angle of incidence corresponding to the projection angle.

9. A table creating method to be implemented by a distance measuring apparatus including a projector that projects laser beam at a projection angle to an object, in response to an indication to control the projection angle, a photodetector array in which a plurality of photodetectors are arranged on a plane, and a condenser lens that concentrates a reflected laser beam reflected from the object on the photodetector array in a direction corresponding to the projection angle, the table creating method comprising:

sequentially changing the projection angles of the laser beam; and at a projection angle among the projection angles, selecting at least one photodetector that corresponds to an area irradiated with a reflected laser beam on the photodetector array, and storing information indicating a correspondence of the selected at least one photodetector corresponding to the area with a projection angle in the sequentially changed projection angles, to cause a processor to select at least one photodetector from which at least one detector receives an output, depending on a distortion of an area on a photodetector array irradiated with a reflected laser beam in accordance with an indication to control a projection angle, the area determinable by an angle of incidence of the reflected laser beam to a condenser lens corresponding to the photodetector array, the angle of incidence corresponding to the controlled projection angle based upon the stored information indicating the correspondence.

* * * * *